United States Patent [19]
Boerger et al.

[11] 3,746,037
[45] July 17, 1973

[54] FLOW CONTROL AND MONITORING SYSTEM

[75] Inventors: Frank E. Boerger; William H. White, Jr., both of Poughkeepsie, N.Y.

[73] Assignee: International Business Machines Corporation, Armonk, N.Y.

[22] Filed: Oct. 6, 1971

[21] Appl. No.: 187,206

Related U.S. Application Data
[63] Continuation of Ser. No. 762,876, Sept. 26, 1968.

[52] U.S. Cl. .......................... 137/487.5, 137/489.5
[51] Int. Cl. ................................................. G05d 7/00
[58] Field of Search.............. 137/487.5, 500, 489.5, 137/495, 486

[56] References Cited
UNITED STATES PATENTS

| | | | |
|---|---|---|---|
| 2,862,162 | 11/1958 | Baring........................ | 137/487.5 X |
| 3,025,669 | 3/1962 | Fischoff...................... | 137/489.5 X |
| 2,938,536 | 5/1960 | Ehrenberg................... | 137/487.5 X |
| 2,311,853 | 2/1943 | Moore........................... | 137/486 X |
| 2,959,352 | 11/1960 | Cunningham................ | 137/489.5 X |
| 3,181,357 | 5/1965 | Benson........................ | 73/204 |

*Primary Examiner*—Henry T. Klinksiek
*Assistant Examiner*—Robert J. Miller
*Attorney*—Hanifin & Jancin

[57] ABSTRACT

The mass flow rate of a fluid is controlled in response to the pressure differential across a restriction in the conduit and in response to the incoming pressure of the fluid. The flow control system includes means to change the fluid flow through the conduit in accordance with desired changes in the mass flow rate through the conduit.

7 Claims, 3 Drawing Figures

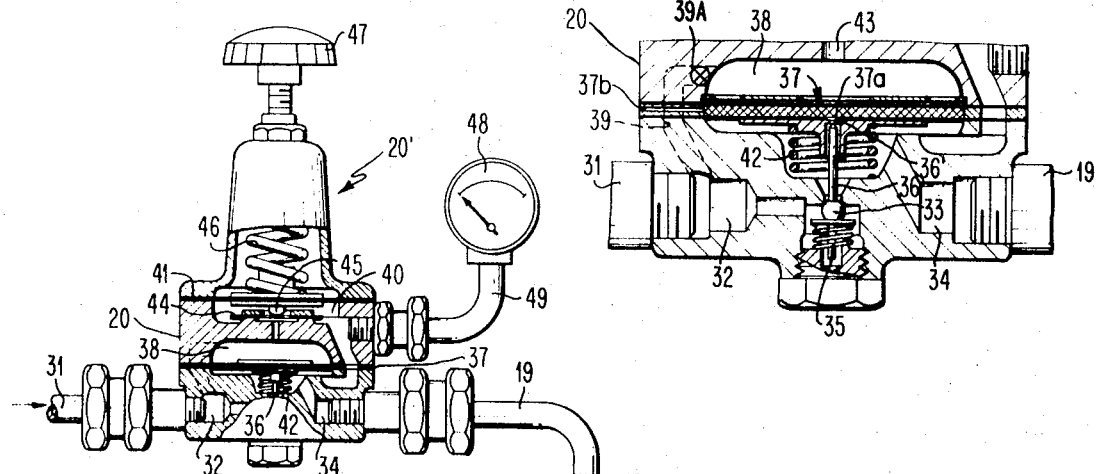

FLOW CONTROL AND MONITORING SYSTEM

This is a continuation of application Ser. No. 762,876 filed Sept. 26, 1968.

In supplying gases to a reaction chamber in which an integrated circuit is formed on a substrate, for example, precise control of the supply of the gases to the reaction chamber is necessary to produce uniformity of the integrated circuits. Since the integrated circuits are formed in the reaction chamber at different times because of the large quantity being produced, it is necessary that the conditions within the reaction chamber always be substantially the same. If the quantity of gas being used in the reaction chamber in the processing step in forming the integrated circuit should vary, this would affect the uniformity of the product produced in different batches, for example.

One previous means of controlling the flow of a gas to a reaction chamber has been to utilize a needle valve. However, a needle valve does not provide precise control of the gas but only coarse control. For example, a needle valve is unable to control the mass flow rate precisely in ranges smaller than the order of about 10 c.c. per minute. With this coarse control, uniformity of the mass flow rate of the gas into the reaction chamber cannot be precisely obtained.

The present invention satisfactorily solves the foregoing problem by providing a flow control system in which precise control of the mass flow rate can be obtained. For example, the control system of the present invention is capable of controlling the mass flow rate when it is 1 c.c. per minute or smaller. Accordingly, the present invention permits the mass flow rate to be precisely controlled so that uniform products are produced within a reaction chamber at different times in which a gas, which has its mass flow rate controlled by the present invention, is employed in the processing step.

In order to obtain a precise pressure as a signal to control the mass flow rate of the gas in the present invention, a pressure regulator of the bleeding type is utilized. This produces a high degree of control of the pressure. However, in the present invention, the gas, which is being controlled, is not passed through the pressure regulator so that it is not bled to the atmosphere. Accordingly, if the gas should be dangerous or undesirable when vented to the atmosphere by being corrosive, explosive, or lethal, for example, the flow control system of the present invention does not permit the gas to be vented to the atmosphere even though a pressure regulator of the bleeding type is utilized. Instead, air, for example, is employed as the fluid which is bled to the atmosphere to obtain the precise pressure signal in accordance with the mass flow rate through the conduit.

By utilizing a separate source of a fluid to control the pressure regulator in the present invention, there is no loss of any of the fluid being controlled. Thus, even if the fluid could be released to the atmosphere without danger, for example, it still might be desired to not waste any of the fluid because of its expense, for example. Thus, the flow control system of the present invention permits precise control of a fluid in which it is desired that none of the fluid be wasted.

Accordingly, the present invention not only provides precise control of the mass flow rate of the fluid but also permits the handling of a fluid, which is desired to not be vented. Thus, the flow control system of the present invention may be utilized wherever it is desired to handle a fluid, which it is desired to not allow to enter the atmosphere, and still obtain control of the mass flow rate thereof in accordance with conditions existing in the control system.

An object of this invention is to provide a flow control system for precisely controlling the mass flow rate of a fluid.

Another object of this invention is to provide a flow control system for controlling the mass flow rate of a fluid that it is desired to not allow to enter the atmosphere.

The foregoing and other objects, features, and advantages of the invention will be more apparent from the following more particular description of the preferred embodiment of the invention as illustrated in the accompanying drawing.

In the drawing:

FIG. 1 is a schematic, partly in section, view of a flow control system of the present inventin.

FIG. 2 is an enlarged sectional view of a portion of the pressure regulator of the bleed type utilized in the flow control system of FIG. 1.

FIG. 3 is a schematic block diagram illustrating how the mass flow rate is automatically controlled by the utilization of the pressure regulator of the flow control system of the present invention.

Referring to the drawing and particulary FIG. 1, there is shown a flow control system of the present invention including an inlet conduit 10, which is connected to a source of pressurized fluid. The conduit 10 is connected to inlet 11 of a housing 12 of a flow controller.

The housing 12 has an outlet 14, which has flow of fluid from the inlet 11 thereto regulated or controlled by a ball valve 15. The valve 15 is responsive to movements of a flexible diaphragm 16, which divides the housing into two separate chambers 17 and 18. One suitable example of the flow controller is Model 63BDL flow controller of Moore Products Co., Spring House, Pa., with the spring, which would act on the diaphragm 16, omitted.

The chamber 18 is connected to the inlet 11 so that the pressure of the inlet fluid acts on one side of the diaphragm 16 via the valve 15. The chamber 17 communicates through a pipe or conduit 19 with a housing 20 of a pressure regulator 20' of the bleeding type. Thus, the output pressure of the regulator 20' is supplied through the conduit 19 to the chamber 17.

Accordingly, the difference in pressures between the chambers 17 and 18 determines the amount of movement of the valve 15 to regulate the fluid flow therethrough. As the pressure within the conduit 10 increases, the valve 15 is moved to reduce the flow through the outlet 14. This is because an increase in the incoming fluid pressure would increase the mass flow rate through the outlet 14. Thus, the mass flow rate is maintained constant irrespective of the pressure of the incoming fluid through the inlet conduit 10.

When the pressure in the conduit 19 increases, the valve 15 is further opened to allow additional flow of the fluid through the outlet 14 of the housing 12. Accordingly, when the pressure from the housing 20 is increased, the mass flow rate through the outlet 14 is increased.

The outlet 14 of the housing 12 is connected to a conduit 21, which is connected to one side of a housing 22 for a needle valve 23. The position of the needle valve 23 is controlled by a handle wheel 24 so that the flow of the fluid through the housing 22 is restricted in accordance with the position of the needle valve 23.

The outlet of the housing 22 is connected through a conduit 25 to a reactor 26. The conduit 25 has a mass flow meter 27 therein to monitor the flow rate to the reactor 26. The general concept of such mass flow meters may be found in U.S. Pat. No. 3,181,357 issued May 4, 1965 to J.M. Benson. One suitable example of the mass flow meter 27 is one such as manufactured by Hastings-Raydist, Incorporated as model number LF-300. This specific mass flow meter produces an electrical signal by means (not shown), which may be utilized with a meter to indicate the mass flow rate through the conduit 25, for example. The output signal of this specific mass flow meter also may be utilized with other equipment as an input to automatically control the mass flow rate through the conduit 25.

The pressure drop across the needle valve 23, which forms the restriction means or orifice within the conduit supplying the fluid from the pressurized source to the reactor 26, is measured by a pressure transducer 28. The pressure transducer has one side connected through a conduit 29 to the conduit 21 while the other side is connected by a conduit 30 to the conduit 25. Accordingly, the pressure transducer 28 measures the pressure differential across the needle valve 23.

For a given pressure drop across the needle valve 23 with the needle valve 23 being in a specific position, the mass flow rate to the reactor 26 will be constant. Thus, as long as there is no variation in the pressure differential across the needle valve 23, the mass flow rate to the reactor 26 is maintained constant.

However, because the reactor 26 has high temperatures existing therein and the various reactions within the reactor 26 may produce corrosion to reduce the amount of flow of the fluid into the reactor 26, the pressure within the conduit 25 will increase. If there is no change in the pressure in the conduit 21, then the pressure differential across the needle valve 23 would drop. As a result, the mass flow rate through the conduit 25 would decrease.

Accordingly, when the pressure differential, which is indicated by the transducer 28, across the needle valve 23 drops, it is necessary to increase the pressure in the conduit 21 to return the pressure differential to the valve at which the desired mass flow rate will occur in the conduit 25 or to change the position of the needle valve 23 to reduce the restriction within the housing 22. However, as previously mentioned, the changing of the position of the needle valve 23 will not produce a precise control of the mass flow rate. For example, if the pressure within the conduit 25 should increase sufficiently to only decrease the mass flow rate one or two c.c. per minute, it would be impossible to adjust the position of the needle valve 23 to obtain this precise correction of the mass flow rate through the conduit 25.

Accordingly, the present invention changes the position of the valve 15 within the housing 12. Thus, by increasing the fluid pressure in the chamber 17, the valve 15 may be moved to allow a greater flow of fluid through the housing 12. This results in the conduit 21 having a greater pressure therein to return the pressure differential across the needle valve 23 to that required to maintain the constant mass flow rate through the conduit 25 to the reactor 26.

Thus, when the pressure differential across the needle valve 23 decreases as indicated on a dial 30' of the transducer 28, the pressure within the chamber 17 is increased by the pressure regulator 20' applying additional pressure through the conduit 19 to move the valve 15 to a further open position. If the pressure within the conduit 25 should decrease so that the pressure differential across the needle valve 23 becomes greater, then the pressure in the chamber 17 is decreased. This is accomplished by bleeding some of the fluid to atmosphere through the housing 20.

The fluid, which is supplied by the conduit 19 to the chamber 17 in the housing 12, is supplied from a pressurized source through an inlet conduit 31 to an inlet 32 of the housing 20. The fluid flows past a ball valve 33 (see FIG. 2) to an outlet 34, which is connected to the conduit 19. Accordingly, the position of the valve 33 determines the pressure within the chamber 17. As the valve 33 restricts flow to the conduit 19, the pressure within the chamber 17 is reduced. Likewise, as the valve 33 allows additional flow from the inlet conduit 31 to the conduit 19, the pressure within the chamber 17 is increased.

The ball valve 33 is continuously urged against its seat by a spring 35 (see FIG. 2). The ball valve 33 has a stem 36 extending upwardly therefrom for cooperation with an aperture 36' (see FIG. 2), which communicates with the interior of a diaphragm 37 via a bleed port 37a. The interior of the diaphragm 37 is vented to the atmosphere at outlet 37b. The diaphragm 37 forms a chamber 38 within the housing 20 into which the fluid entering through the conduit 31 is supplied by a passage 39 in the housing 20 and containing a restriction 39A preferably of a fixed size.

The other side of the diaphragm 37 communicates with the outlet 34 of the housing 20 and with a chamber 40, which is formed in the housing 20 beneath a diaphragm 41. In addition to the pressure within the chamber 40 acting on the lower side of the diaphragm 37, a spring 42, which surrounds the stem 36 of the ball valve 33, also acts on the lower side of the diaphragm 37.

The chamber 38 is vented through a passage 43 in the housing 20 to the chamber 40. A flexible seat 44 has a protrusion 45, which is attached to the diaphragm 41, acting thereon to reduce the size of the outlet of the passage 43 into the chamber 40. Thus, as a spring 46, which is mounted within the housing 20 above the diaphragm 41, has its force increased by turning a hand wheel 47 in one direction, the diaphragm 41 is moved downwardly to cause the protrusion 45 to reduce the flow from the chamber 38 through the passage 43. As a result, the pressure within the chamber 38 increases to further open the ball valve 33 to increase the fluid pressure in the conduit 19. Thus, the pressure within the chamber 17 is increased when the force of the spring 46 is increased.

Likewise, when the hand wheel 47 is turned in the opposite direction, the force of the spring 46 is reduced to allow the diaphragm 41 to move upwardly and permit additional flow from the chamber 38 through the passage 43. This results in the diaphragm 37 moving upwardly to allow fluid to be bled to the atmosphere through the diaphragm 37 due to the diaphragm 37 moving the aperture therein away from the stem 36. This upward movement of the diaphragm 37 also results in the ball valve 33 moving upwardly to decrease flow from the inlet 32 to the outlet 34 of the housing 20. The initial bleeding of the fluid to the atmosphere and the change in the position of the ball valve 33 serve to reduce the fluid pressure within the chamber 17. When this occurs, the ball valve 15 is moved to a position to restrict the flow of fluid through the housing 12 and reduce the mass flow rate through the conduit 25 to the reactor 26.

Accordingly, when the pressure differential across the needle valve 23 decreases, the force of the spring 46 is increased to raise the pressure within the chamber 17; this increases the pressure in the conduit 21 to return the pressure differential across the needle valve 23 to the desired value. Likewise, if the pressure differential should increase, then the force of the spring 46 would be reduced to decrease the pressure within the chamber 17. This would lower the pressure within the conduit 21 and return the pressure differential across the needle valve 23 to the desired value. This also would reduce the mass flow rate through the conduit 25.

A specific example of the regulator 20' having particular utility in this invention is one such as the Series 40 bleeding valve regulator of Moore Products Co., Spring House, Pa.

Considering the operation of the present invention, the hand wheel 47 is turned to produce the desired pressure in the conduit 19. This desired pressure is obtained from a gauge 48, which is connected by a conduit 49 with the chamber 40 and the area beneath the diaphragm 37. Then, the needle valve 23 is adjusted to obtain the desired flow rate through the conduit 25. This can be determined by reading the mass flow meter 27. If the exact flow rate is not obtained through positioning of the needle valve 23 because of its inability to precisely regulate the flow therethrough, then the hand wheel 47 is turned to obtain the precise mass flow rate through the conduit 25.

when the fluid flows through the conduit 25 at the desired mass flow rate, a specific pressure differential exists across the needle valve 23 as indicated on the dial 30' of the transducer 28. If this pressure should change, it is then necessary to change the force of the spring 46 to return the mass flow rate to its desired value. As previously mentioned, this change in differential pressure could be due to the temperature within the reactor 26 or to flow being restricted due to corrosion created by the fluid, for example. In either instance, the transducer 28 not only indicates a change in the pressure differential but the mass flow meter 27 also indicates that there has been a change in the mass flow rate. Accordingly, the force of the spring 46 must be adjusted to return the mass flow rate to the desired value.

If it should now be desired to slightly change the mass flow rate such as 1 c.c. per minute, for example, the hand wheel 47 must again be turned to change the mass flow rate. When the desired pressure differential is indicated by the transducer 28 as correlated to the pressure shown on a gauge 50, which is utilized to indicate the pressure within the conduit 21, turning of the hand wheel 47 is stopped. At this time, a new pressure differential exists across the needle valve 23 as indicated on the dial 30' of the transducer 28. Any variation therein and/or in the reading of the mass flow meter 27 causes a requirement for the spring 46 to have its force changed.

There is automatic compensation for any change in the pressure of the fluid entering through the inlet 11 through changing the position of the ball valve 15. Thus, if the pressure in the inlet conduit 10 should increase, the diaphragm 16 moves upwardly to reduce the flow to the conduit 21. Likewise, if the pressure in the inlet conduit 10 should decrease, the diaphragm 16 moves downwardly to increase the flow of fluid to the conduit 21 to maintain a substantially constant pressure in the conduit 21 irrespective of the pressure of the source of the fluid.

Since the pressure differential across the needle valve 23 must be maintained constant to obtain the desired mass flow rate through the conduit 25, it is necessary to ascertain the pressure within the conduit 21 to maintain the pressure below a safe maximum value by reading the gauge 50. If the pressure within the conduit 21 increases beyond the safe maximum value, the gauge 50 indicates this so that the system may be shut down. This would occur when the pressure within the conduit 25 continues to increase so as to require a continued increase in the pressure in the conduit 21 to maintain the desired pressure differential across the needle valve 23. Since it is desired for the pressure in the conduit 21 to not exceed the maximum safe limit, the gauge 50 may be utilized to determine when this pressure is reached so that the system can be shut down.

While the present invention has been described with an operator determining when to turn the hand wheel 47, it should be understood that the present flow control system may be automatically controlled. Thus, for example, as shown in FIG. 3, the transducer 28 may be connected to a computer 51 to indicate the pressure differential across the needle valve 23. When the electrical signal from the transducer 28 decreases due to a drop in differential pressure across the needle valve 23, the computer 51 produces a signal to a servomotor 52, which would control the force on the spring 46, to cause an increase in the force of the spring 46 to raise the pressure within the chamber 17.

Likewise, if there should be an increase in the differential pressure across the needle valve 23 as indicated by the transducer 28, this signal to the computer 51 would cause the servomotor 52 to reduce the force on the spring 46. This would result in the pressure to the chamber 17 decreasing whereby the pressure in the conduit 21 would fall to return the differential pressure to that constant at which the desired flow rate is to be maintained.

The gauge 50 also could be a transducer, which would be connected to the computer 51. When the pressure in the conduit 21 exceeded some maximum safe value, the gauge 50 could provide a signal to the computer 51 to shut down the system.

Instead of relying upon the transducer 28 to hold the desired mass flow rate, the computer 51 could be connected to the mass flow meter 27. As described with respect to the transducer 28, the mass flow meter 27 would supply electrical signals to the computer 51 to cause correct movement of the servomotor 52 to maintain the mass flow rate through the conduit 25 constant.

If it were desired to increase or decrease the mass flow rate, it would only be necessary to supply a signal through an appropriate control to the computer 51 to cause positioning of the servomotor 52 to increase or decrease the mass flow rate. Thus, an automatic arrangement for controlling the mass flow rate with the flow control system of the present invention may be employed, if desired, as will be readily apparent to one skilled in the art.

While the present invention has described the flow rate as being controlled in a conduit in which there is a restriction or orifice, it should be understood that the needle valve 23, which forms the restriction or orifice in the conduit, may be omitted when low flow rates are not desired. In such an arrangement, only the mass flow meter 27 could be utilized to measure the mass flow rate through the conduit 25 since the absence of the needle valve 23 would eliminate the pressure differential thereacross.

While the pressure regulator has been described as having the output pressure varied through changing the force of the spring 46, it should be understood that other means for exerting a controlled force on the diaphragm 41 may be employed. For example, a fluid pressure could be utilized.

An advantage of this invention is that a fluid may be supplied at a constant mass flow rate irrespective of changes in pressure of the supply fluid or pressure in the chamber to which the fluid is to be supplied. Another advantage of this invention is that there is no waste of any of the supply fluid while still obtaining the precise control desired. A still further advantage of this invention is that fluids may be precisely controlled without any venting thereof to the atmosphere while utilizing a bleed type pressure regulator.

While the invention has been particularly described with reference to a preferred embodiment thereof, it will be understood by those skilled in the art that various changes in form and details may be made therein without departing from the spirit and scope of the invention.

What is claimed is:

1. A fluid control system comprising:
    A. a fluid conduit adapted to have a pressurized fluid supplied at the inlet thereto;
    B. means in said conduit intermediate the inlet and outlet thereof to restrict fluid flow therethrough;
    C. first control means in said conduit upstream of said restriction means to compensate for changes in pressure of the supply fluid and to vary the flow of fluid in accordance therewith to maintain a desired mass flow rate constant at the outlet of said conduit;
    D. means responsive to the pressure differential across said restriction means and for sensing the deviation in the mass flow rate therethrough from a desired valve;
    E. second control means for regulating said first control means to compensate for said deviation in mass flow rate across said restriction means sensed by said differential pressure responsive means; with said first control means including
    F. valve means in said conduit intermediate said restriction means to control the mass flow rate of fluid through said conduit, and
    G. pressure responsive means controlling the flow position of said valve means with said pressure responsive means having one side responsive to the pressure of the outlet side of said valve means; said second control means having
    H. means to apply an output fluid pressure to the other side of said pressure responsive means of said first control means, and
    I. means to regulate said output fluid pressure as required in accordance with the desired mass flow rate at the outlet of said conduit.

2. The system according to claim 1 in which said second means includes means to bleed the fluid providing the output fluid pressure to maintain the output fluid pressure at the selected value.

3. The system according to claim 1 in which said regulating means of said second means includes means to vary the output fluid pressure to change the flow rate of the supply fluid through said conduit.

4. The fluid control system of claim 1 wherein said regulating means is responsive to the sensed deviation, of the differential pressure responsive means, in the mass flow rate from a desired value to regulate the said output fluid pressure as required to maintain the mass flow rate constant.

5. The fluid control system of claim 4 wherein said second control means comprises a pressure regulator having a servo means for controlling said regulating means in response to said differential pressure responsive means in accordance with sensed deviation of the mass flow rate from a desired value.

6. A fluid control system comprising:
    A. a fluid conduit adapted to have a pressurized fluid applied at the inlet thereof;
    B. means in said conduit intermediate the inlet and outlet thereof to restrict fluid flow therethrough;
    C. flow control means in said conduit upstream of said restriction means for establishing and maintaining a desired mass flow rate of a fluid in said conduit;
    D. means responsive to the pressure differential across said restriction means for sensing deviation from a desired value in the mass flow rate of a fluid at the terminal portion of said conduit, and
    E. means for regulating said flow control means to compensate for deviations in the mass flow rate sensed by said pressure differential responsive means.

7. A fluid control system comprising:
    A. a fluid conduit adapted to have a pressurized fluid applied at the inlet thereof;
    B. means in said conduit adjacent the outlet thereof for sensing the deviation of the mass flow rate of a fluid through said court from a desired value thereof;
    C. flow control means in said conduit intermediate the inlet thereof and said sensing means for controlling the mass flow rate of a fluid through said conduit; and
    D. means responsive to said sensing means for regulating said flow control means to compensate for said deviations in the mass flow rate of said fluid.

* * * * *